PROCESS FOR PREPARING AND PRESERVING POTATOES

Original Filed June 1, 1949 2 Sheets-Sheet 1

Inventor
HENRY M. CHASE,

Robert B. Larson
ATTORNEY

PROCESS FOR PREPARING AND PRESERVING POTATOES

Original Filed June 1, 1949 2 Sheets-Sheet 2

Inventor
HENRY M. CHASE,

Robert B Pearson ATTORNEY

United States Patent Office

Re. 23,891

Reissued Nov. 2, 1954

23,891

PROCESS FOR PREPARING AND PRESERVING POTATOES

Henry M. Chase, Nampa, Idaho

Original No. 2,597,065, dated May 20, 1952, Serial No. 96,421, June 1, 1949. Application for reissue May 18, 1954, Serial No. 430,752

6 Claims. (Cl. 99—193)

Matter enclosed in heavy brackets [ ] appears in the original patent but forms no part of this reissue specification; matter printed in italics indicates the additions made by reissue

This invention relates to a process for preparing and treating potatoes. More particularly, the invention relates to a process in accordance with which potatoes are subjected to a series of processing steps including conditioning for starch and sugar content, washing, peeling, cutting, blanching, partially drying, and packaging for fresh consumption, or quick freezing and packaging to prepare and preserve the potatoes on a mass production basis.

While packaged quick frozen foods of various types are available for domestic use, up to the present time no wholly satisfactory method has been devised for processing and packaging of various cuts of potatoes by methods which include quick freezing, [,without seriously deteriorating the quality from the natural state]. It is a principal object of the present invention to provide a satisfactory method or process of preparing and preserving potatoes in different style cuts such as, for example, "French fries," "shoestrings," "hash-browns," and for quick freezing the same so that they may without additional preparation, or without thawing, be cooked and still maintain or better their original quality.

Another object of the invention resides in effecting a series of process steps which avoid or overcome certain conditions which heretofore have rendered it impossible to produce a packaged frozen non-cooked potato in cut form ready for deep frying or other cooking, that remains tasty and palatable.

Figure 1:
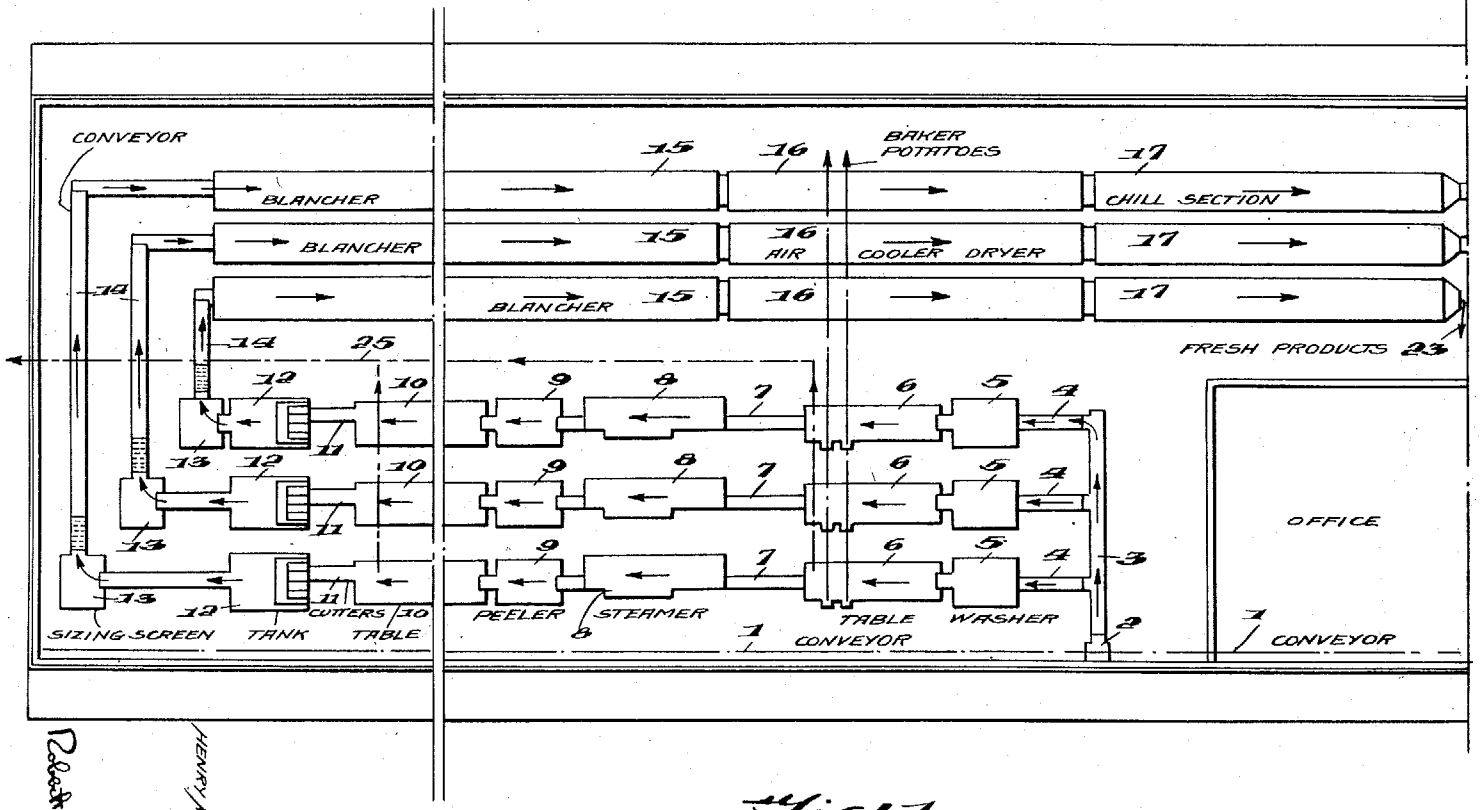
Figure 1A:
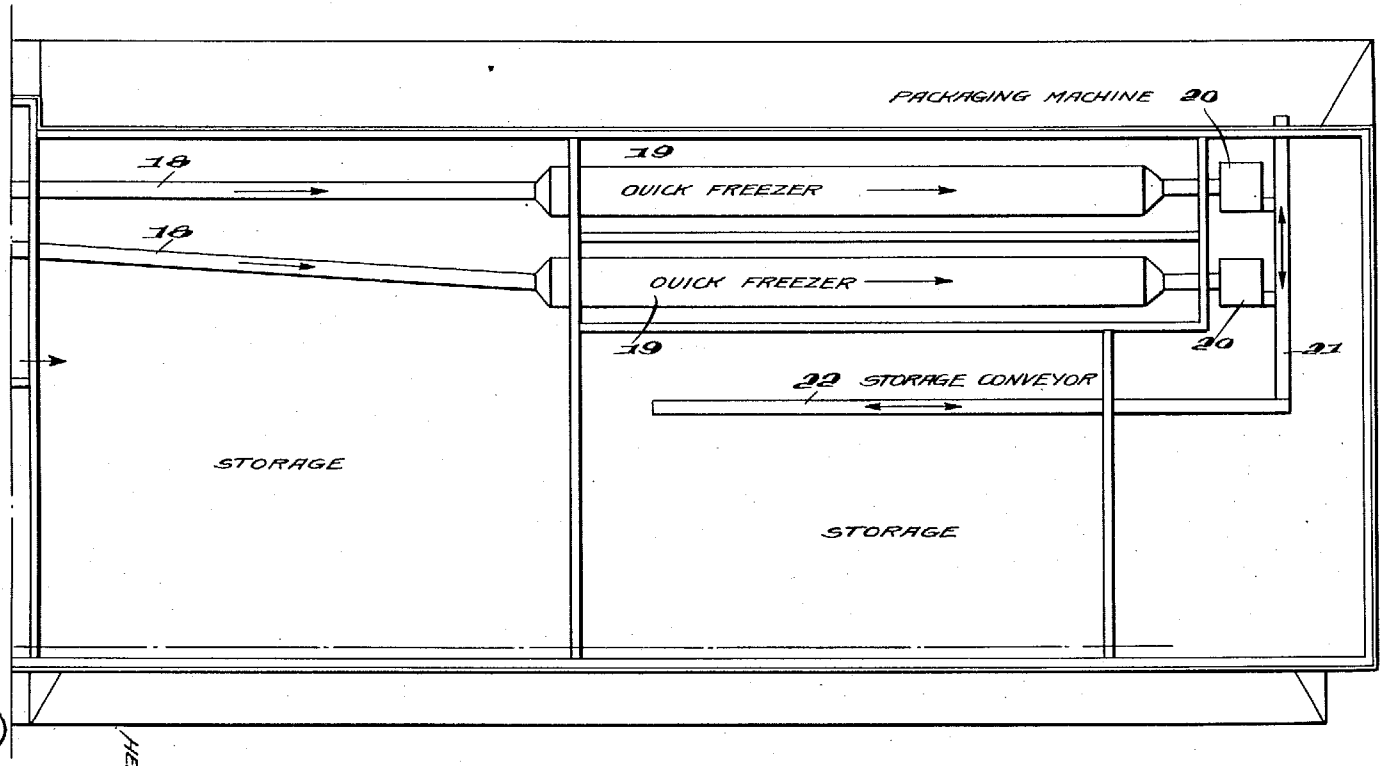

These and other objects and advantages will become more apparent from the following description and claims when read in conjunction with the accompanying drawings, in which Figs. 1 and 1A show diagrammatically a processing plant for carrying out the invention.

*Until the time of this invention, the frozen food industry had found it impossible to prepare a satisfactory frozen potato product. Their efforts to freeze raw potatoes for consumer use were failures principally because, even after the slightest thawing, the product would turn dark and would appear completely unpalatable.*

*The industry found, however, that, if the potato were cooked before freezing, it would not darken upon freezing. Unfortunately, however, the precooked product will not retain its crisp freshly prepared consistency upon subsequent cooking. Further, the product has a tendency to soak up an undesirable amount of grease when fried. The result is a limp, relatively soggy food as compared to a potato which is cooked from the raw state.*

*Through this invention, it is now possible to obtain a frozen potato product which does not darken upon thawing and which maintains the physical characteristics of the raw potato. Further, the product, according to the present invention, can be deep fried without absorbing too much grease and without as great a reduction in the temperature of the cooking grease as results from cooking fresh potatoes.*

*At least two principal factors are involved in providing a frozen potato product having the qualities referred to above. The more important of these resides in the treatment of the potato in such a manner as to prevent the darkening after thawing, but without substantially altering the physical characteristics of the raw potato.*

*Further, the inventor has discovered that it is possible to treat the potato with sufficient heat to prevent darkening while limiting the heat to an amount which is insufficient to cook the potato completely, thereby retaining the raw characteristics. Thus, the invention provides a process for preparing a frozen potato product, which product will not darken and which has all the flavor and crisp resiliency of the fresh, cut potato.*

In many instances it is advisable as a preliminary step to processing as will be described, to store the fresh potatoes in conditioning rooms or the like where the temperature can be regulated for heat and cold. As the potatoes are placed in such rooms, they are tested for sugar content so that it can be ascertained how long it will be necessary to store the potatoes in a warm room (for example, at 70° F.) in order to change the excess sugar to starch and to render the potatoes in proper condition for the process which will now be described.

After such preliminary conditioning mentioned, the potatoes may be conveyed into the processing plant shown in the drawings by means of a belt line convevor indicated by the reference numeral 1. This belt line conveyor 1 delivers the potatoes to an elevator 2 which elevates them to a master distributing conveyor 3. The conveyor 3 in turn feeds three processing lines through the medium of short belt line conveyors 4 which, in the first instance, convey the potatoes to washers indicated by the reference numeral 5.

Each washer 5 is a cleaning apparatus which is provided, for example, with revolving fiber brushes. The potatoes are also subjected here to a heavy cold water spray with a pressure of about 80 pounds. The potatoes are thus cleaned by the revolving fiber brushes under the heavy water spray in this washer 5 and are then dropped onto sorting tables 6 where all waste is picked out. Then, advantageously, two sizes of hand-picked baker potatoes are placed on side delivery belts (shown in dotted lines and indicated by the reference numeral 25) to be carried or conveyed to cars or to the storage room. The rest of the potatoes then drop down to conveyors 7 by which they are transported to the steamers 8.

In the steamers 8, which may be in the form of drums, the potatoes are steamed for one-half to three-quarters minute at a steam pressure of from 80 to 100 pounds. The steamers are continuous. The time that the potatoes are in the steamers depends on their temperature at the time they enter the steamer. For example, if they are at 70° F. when they enter the steamers it is only necessary that they remain in the steamers for one-half minute.

From the steamers 8 the potatoes are dropped into the washer-peeler indicated by the reference numeral 9. This washer-peeler 9 is preferably of a revolving type with soft fiber brushes which are adapted to engage the thin outer skin of the potatoes. At the same time that the fiber brushes operate on the potatoes the potatoes are under a heavy ice-water spray. This ice-water spray processing which follows the steaming in the steamers 8 at around 100 pounds steam pressure effects a sudden change in temperature and "shocks" the skin off the potatoes. Moreover, with the rolling action of this washer (which in the example shown is some 12 feet long), the potatoes rub against each other until all of the thin outer skin is removed without disturbing any of the inner covering, thereby saving all of the nutritive content of the food, or the vitamins. This is important since, it is understood, most of the food value in potatoes, aside from the starch, is contained in the outer three-eighths of an inch. The skin is removed without cooking into the potato as is the case in most known processing lines.

From the washer-peeler 9 the potatoes pass to specking or clean-up tables 10, where operators manually trim out all eyes and specks. Fresh water troughs on either side of the tables permit the operators to dip the potatoes therein so that when the potatoes leave this table 10 they are thus entirely clean and ready to be cut into the various desired sizes and shapes.

From the tables 10 the potatoes are elevated to the strip cutters or slicing machines 11. These machines cut the potatoes into any desired shapes and sizes such as "French-fries," "shoestrings," "boilers," "hash-browns," or other sizes. The cutting machines then drop the cut pieces of potatoes into the tanks 12 which, preferably, contain a solution comprised of one five-hundredths of a pound of sodium bisulphite to one gallon of water. The cut potatoes remain in this solution about two or three minutes and then pass out on a conveyor or a mesh belt of a stainless steel or the like to the sizing screens 13. While on the conveyor belt between the tanks 12 and the sizing screens 13 the potatoes are subjected to a fine fresh-water spray so as to rinse off all of the solution. When they reach the sizing screen 13 the sizing screen eliminates all under-sized stock.

From the sizing screen the potatoes are elevated to a belt conveyor 14 which delivers the processed stock to the blanchers 15. In the processing plant illustrated diagrammatically, each of these three blanchers 15 is about 72 feet long and is provided preferably with a stainless steel web belt or the like mounted on rollers which passes completely through the blancher and on through the adjacent air cooler 16, and chill section 17, and in the case of two of the three processing lines, then through the quick-freeze tunnels 19.

In the blanchers 15 there are a succession of live steam jets spaced along the line. The potatoes are exposed to the live steam for about from two to three minutes, depending on the volume and time required for the size being run. The temperature employed is from 180 to 210 degrees F., and preferably about 210° F. The live steam has the effect of killing the enzymes *without seriously deteriorating the quality from the natural state.*

From the blanchers 15 the lines continue, as indicated, to the air coolers or dryers 16. These dryers are each provided with a series of air fans or other means which direct air onto the potatoes from above and below, or from various angles, so as to remove the surface moisture from the potatoes. These dryers 16 in the embodiment shown diagrammatically are about 40 feet long.

From the dryers or air coolers 16 the lines, as indicated, continue through the chill sections 17 which are refrigerated in such manner that the temperature therein is maintained just above 0° F. The potatoes are cooled in these chill sections to a temperature of about from 35 to 38 degrees F. by the time they reach the end of the line.

If the potatoes are not to be quick-frozen, they are then ready for packaging if they are to be used fresh, and may be stored in the storage room of the processing plant which is maintained at a temperature of about 35° F. In the drawing, the lowermost line is the line for potatoes which are not to be quick-frozen and which are to be stored as thus indicated, or all lines may be diverted either for packaging fresh, at the end of the chilling section 17, or all the lines may be diverted from the end of section 17 onto the conveying belt line section 18 to be conveyed to the freezing section 19 in order to be frozen.

The other two lines 18 continue through the storage room to the quick-freezing tunnels 19, where they are subjected to quick-freeze temperatures of from 15 to 20 degrees below zero. When they come out of the quick-freeze tunnels they are then moved to packaging machines 20 which package the potatoes and from which they are then conveyed to a zero degree temperature storage room on the two-way belt conveyor. After the potatoes have been in the zero storage room for a few hours, they are ready to load on cars via the two-way belt line conveyor 21 and 22.

I have found that potatoes so treated will keep for many months without any change in condition when stored at zero temperature.

A portion of the processing referred to can be employed also for producing a "hash-brown" package which contains individual cakes or patties mixed with a very small amount of flour, water and salt. After the potatoes have passed through the blanching and partial drying in the dryers 16, they are shredded and mixed very gently in a type of barrel tumbling action mixer with the ingredients mentioned. Then they are molded into patties about 3½" across and about ⅝" thick. After molding they are placed on the conveyer and run through the quick-freeze tunnels 19 and are then ready to package as desired.

So that my reference to the various potato cuts shall be clear to others, I shall describe them briefly, the dimensions given being approximate:

"French fries" are cut in strips 3 to 7 inches long, in two sizes ⅜ inch square and ½ inch square.

"Shoestrings or Julienne" are cut in strips 3 to 7 inches long, ¼ inch square.

"Cottage or American fries" are cut in slices crossways of the potato 3/16 inch thick, from 1 inch to 3 inches across, depending upon the size of the potato.

"Hash brown patties," as stated, are moulded from potatoes that have been shredded, then moulded into patties 3½ inches across and ⅝ inch through.

"Boiling potatoes" are cut into strips and small pieces not over one inch through and 1 inch to 7 inches long. These sizes are necessary in order that the solution and blanching will penetrate through.

"Baking potatoes" are graded in two sizes, 8 to 12 ounces and 12 to 16 ounces, washed oven clean and conditioned for sugar and starch before grading.

When cooking the frozen cuts to which reference has been made (except the [patties,] boilers, and bakers), the potatoes are placed in a deep fat fryer directly from the freezer without thawing, and will cook in about 3 minutes with the cooking oil at a temperature of around 375° F. It has been found that they will cook crisper and stay crisp much longer than fresh potatoes similarly cooked.

Not all types of potatoes are found to produce the best results. Some lots of potatoes contain too much sugar, and it is necessary to condition many of them by storing at 70° F. in order to turn the sugar back into starch. This conditioning brings the sugar and starch both to the right proportions for proper deep frying so that every lot will cook about the same. This is accomplished, as indicated, before the potatoes are steam peeled. By experimentation I have found that potatoes known as "Netted Gem" or "Russet" give very excellent results.

I claim:

1. In a continuous process for preparing and preserving white potatoes for subsequent cooking, the steps of subjecting cut pieces to live steam for a period of two to three minutes at temperatures of approximately 210° F., subjecting the cut pieces to forced air currents to remove all outside moisture, to dry partially the outside of the pieces, and to gradually reduce the temperature of the potatoes, and gradually chilling the pieces to reduce their temperature to about 35° to 38° F.

2. In a process for preparing potatoes for cooking, the preliminary step of removing the skins by subjecting the potatoes briefly to live steam and immediately subjecting the potatoes to ice-cold liquid sprays, whereby a sudden change of temperature in the potato is effected and the skins are "shocked" away from the potatoes.

3. In a process for preparing potatoes for cooking, the preliminary step of removing the skins by subjecting the potatoes briefly to live steam and immediately subjecting the potatoes to ice cold liquid sprays, whereby a sudden change of temperature in the potato is effected and the skins are "shocked" away from the potatoes, and a gentle rubbing action.

4. A continuous process for preparing and preserving white potatoes, comprising the steps of removing the skin by subjecting the potatoes to steam at 100 pounds steam pressure for one-half to three-quarters of a minute, followed by spraying with ice water at about 80 pounds pressure while gently rubbing the potatoes together, cutting the potatoes to cooking shapes and sizes, treating the cut pieces in an aqueous solution of sodium bisulphite, blanching the pieces with live steam at temperatures ranging from 180° to 210° F. for from 2 to 3 minutes to [kill] *inactivate* the enzymes, subjecting the blanched pieces to air currents to surface dry them, [cooking] *cooling* the potatoes gradually to temperatures of from about 35–38 degrees Fahrenheit, and quick freezing the partially dried, chilled pieces.

*5. In a process for preserving white potatoes for subsequent cooking which process includes quick freezing of cut pieces at temperatures below zero degrees F. the preliminary steps of subjecting cut pieces to live steam for a period of two to three minutes at temperatures of approximately 210° F. to inactivate the enzymes without seriously deteriorating from the quality of the raw potato, and subjecting the cut pieces to forced circulating air to remove moisture in the surface of the cut pieces.*

*6. A frozen potato patty comprising, substantially non-cooked potato shreds cohering in a patty form and in frozen state, and in which the enzymes of said shreds are inactivated while the shreds substantially retain the original characteristics of the raw potato.*

(References on following page)

References Cited in the file of this patent or the original patent

UNITED STATES PATENTS

| Number | Name | Date |
|---|---|---|
| 719,617 | Scovill | Feb. 3, 1903 |
| 2,001,703 | Brown | May 21, 1935 |
| 2,101,506 | Morrow et al. | Dec. 7, 1937 |
| 2,166,278 | Alderfer | July 18, 1939 |
| 2,364,049 | Bensel | Dec. 5, 1944 |
| 2,420,322 | Matarazzo | May 13, 1947 |

| Number | Name | Date |
|---|---|---|
| 2,477,605 | Howard et al. | Aug. 2, 1949 |
| 2,506,793 | Kalmar et al. | May 9, 1950 |
| 2,597,065 | Chase | May 20, 1952 |

OTHER REFERENCES

"Quick Frozen Foods," February 1948, page 84, article entitled "Cooked and Prepared Frozen Foods."

"Quick Frozen Foods," June 1949, page 67.